(12) United States Patent
Chang

(10) Patent No.: US 10,260,549 B2
(45) Date of Patent: Apr. 16, 2019

(54) QUICK-RELEASE ENGAGEMENT DEVICE

(71) Applicant: MULTI-TEK FASTENERS & PARTS MANUFACTURER CORP., Tainan (TW)

(72) Inventor: Chih-Feng Chang, Tainan (TW)

(73) Assignee: MULTI-TEK FASTENERS & PARTS MANUFACTURER CORP., Tainan (TW)

( * ) Notice: Subject to any disclaimer, the term of this patent is extended or adjusted under 35 U.S.C. 154(b) by 172 days.

(21) Appl. No.: 15/348,104

(22) Filed: Nov. 10, 2016

(65) Prior Publication Data

US 2018/0080492 A1     Mar. 22, 2018

(30) Foreign Application Priority Data

Sep. 22, 2016 (TW) .............................. 105130589 A

(51) Int. Cl.
| | |
|---|---|
| *F16B 35/02* | (2006.01) |
| *F16B 35/04* | (2006.01) |
| *F16B 35/00* | (2006.01) |
| *F16B 37/08* | (2006.01) |

(52) U.S. Cl.
CPC .............. *F16B 35/02* (2013.01); *F16B 35/00* (2013.01); *F16B 35/041* (2013.01); *F16B 37/08* (2013.01); *F16B 37/0807* (2013.01); *Y10T 403/7056* (2015.01)

(58) Field of Classification Search
CPC ......... Y10T 403/3953; Y10T 403/7056; Y10T 403/7067; Y10T 403/7069; F16B 35/02; F16B 35/041; F16B 37/08; F16B 37/0807; F16B 37/0857

USPC ............ 403/195, 370, 374.3, 374.4, DIG. 4; 33/501.12, 203.11, 501.14, 199 R
See application file for complete search history.

(56) References Cited

U.S. PATENT DOCUMENTS

| | | | | | |
|---|---|---|---|---|---|
| 2,340,428 | A | * | 2/1944 | Ramsdell ................. | G01B 3/36 33/199 R |
| 3,158,059 | A | * | 11/1964 | Myers ..................... | F16B 35/02 411/49 |
| 3,266,364 | A | * | 8/1966 | Becker .................. | F16B 19/109 411/44 |
| 3,816,934 | A | * | 6/1974 | Johnson ................... | G01B 3/48 33/199 R |
| 3,859,730 | A | * | 1/1975 | Johnson ................... | G01B 3/40 33/199 R |
| 4,649,727 | A | * | 3/1987 | Gray ..................... | B21J 15/022 29/240 |

(Continued)

*Primary Examiner* — Josh Skroupa
*Assistant Examiner* — Cory B Siegert
(74) *Attorney, Agent, or Firm* — Brooks Kushman P.C.

(57) ABSTRACT

A quick-release engagement device for a female threaded member includes a tubular member and an actuating unit. The tubular member includes a contractible portion which has a male threaded segment and an actuated segment, and which is divided into a plurality of contractible sectors by a plurality of slits. The actuating unit is configured to press the actuated segment to permit the contractible sectors to deform synchronously from an expanded state, where the female threaded member is permitted to be in threaded engagement with the male threaded segment, to a contracted state, where the female threaded member is permitted to be quickly sleeved on or removed from the male threaded segment.

7 Claims, 10 Drawing Sheets

(56) References Cited

U.S. PATENT DOCUMENTS

| | | | | |
|---|---|---|---|---|
| 5,020,230 A | * | 6/1991 | Greenslade | G01B 3/48 33/199 R |
| 5,199,175 A | * | 4/1993 | Green | G01B 3/48 33/199 R |
| 7,343,685 B1 | * | 3/2008 | Sorensen | G01B 3/48 33/199 B |
| 8,342,787 B2 | * | 1/2013 | Smith | F16B 35/041 411/354 |

* cited by examiner

QUICK-RELEASE ENGAGEMENT DEVICE

CROSS-REFERENCE TO RELATED APPLICATIONS

This application claims priority from Taiwanese patent application No. 105130589, filed on Sep. 22, 2016.

TECHNICAL FIELD

The disclosure relates to a quick-release engagement device, more particularly to a quick-release engagement device for a female threaded member.

BACKGROUND

Taiwanese Patent No. 1513955 discloses a conventional thread measuring tool used for checking a female threaded member, such as a nut. As shown in FIG. 1, the thread measuring tool is a rotating shaft 8 with a male threaded end segment 7. The male threaded end segment 7 has a "go" gauge region 71, a "no go" gauge region 72, and a mid gauge region 73. A nut has to be threaded on the "go" gauge region 71, and cannot be threaded on the "no go" gauge region 72.

In addition, when the nut is threaded on the male threaded end segment 7 of the rotating shaft 8, an indicator (e.g., dial indicator) may be used to measure concentricity of a female thread in the nut. During measurement of the nut using the indicator, a plunger of the indicator is in contact with an end surface of the nut which is disposed to surround the rotating shaft 8. By rotating the rotating shaft 8, any irregularities in concentricity of the female thread of the nut will result in a displacement of the plunger.

SUMMARY

An object of the disclosure is to provide a novel quick-release engagement device for a female threaded member. With the quick-release engagement device, the female threaded member can be quickly engaged on a male threaded segment of a tubular member for inspection or any other processes, and can be quickly released from the male threaded segment.

According to a first aspect of the disclosure, a quick-release engagement device for a female threaded member with an inner minor diameter includes a tubular member and an actuating unit. The tubular member extends along a central axis, and includes a contractible portion which has a male threaded segment and an actuated segment disposed downwardly of the male threaded segment. The contractible portion has a plurality of slits which extend through the male threaded segment and the actuated segment, respectively, and which are angularly displaced from each other about the central axis, such that the contractible portion is divided into a plurality of contractible sectors, two adjacent ones of which are gapped by a corresponding one of the slits. The actuating unit is configured to press the actuated segment such that the contractible sectors are permitted to move inwardly, radially, and synchronously from an expanded state, where the contractible sectors are remote from the central axis to permit the female threaded member to be in threaded engagement with the male threaded segment, to a contracted state, where the contractible sectors are closer to the central axis to permit the female threaded member to be quickly sleeved on or removed from the male threaded segment.

According to a second aspect of the disclosure, a quick-release engagement device for a female threaded member with an inner minor diameter includes a tubular member and an actuating unit. The tubular member extends along a central axis in the longitudinal direction to terminate at upper and lower ends, and has a male threaded segment proximate to the upper end, and an actuated segment distal from the upper end. The tubular member has a plurality of slits which extend from the upper end through the male threaded segment and the actuated segment, respectively, and which are angularly displaced from each other about the central axis. The actuated segment is divided into a plurality of actuated regions, two adjacent ones of which are gapped by a corresponding one of the slits. The actuated regions are configured to be driven to radially and synchronously move from a remote position, where the actuated regions are remote from the central axis, to a closer position, where the actuated regions are closer to the central axis. The male threaded segment is divided into a plurality of male threaded regions, two adjacent ones of which are gapped by the corresponding one of the slits. The male threaded regions are configured to radially and respectively move with the actuated regions between a contracted position, where the male threaded regions cooperatively define a smaller outer major diameter which is smaller than the inner minor diameter of the female threaded member so as to permit the female threaded member to be quickly sleeved on or removed from the male threaded segment, and an expanded position, where the male threaded regions cooperatively define a larger outer major diameter to permit the female threaded member to be in threaded engagement with the male threaded segment. The actuating unit is configured to press the actuated regions to move radially and synchronously from the remote position to the closer position.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
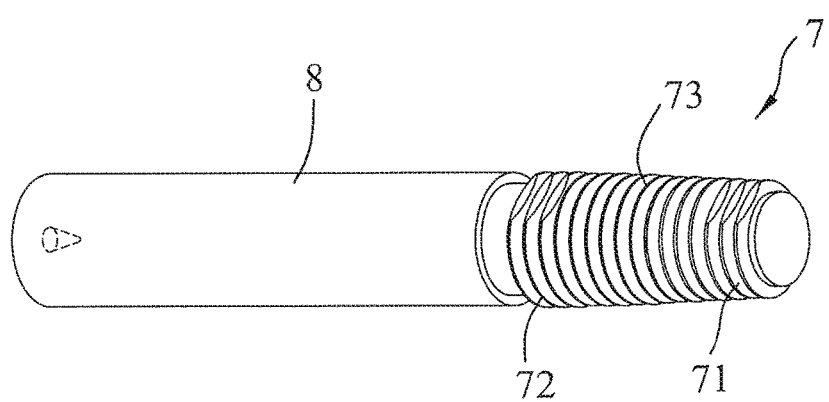
FIG. 1 is a schematic perspective view illustrating a conventional thread measuring tool.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Before the disclosure is described in greater detail, it should be noted that where considered appropriate, reference numerals have been repeated among the figures to indicate corresponding or analogous elements, which may optionally have similar characteristics.

Figure 2:
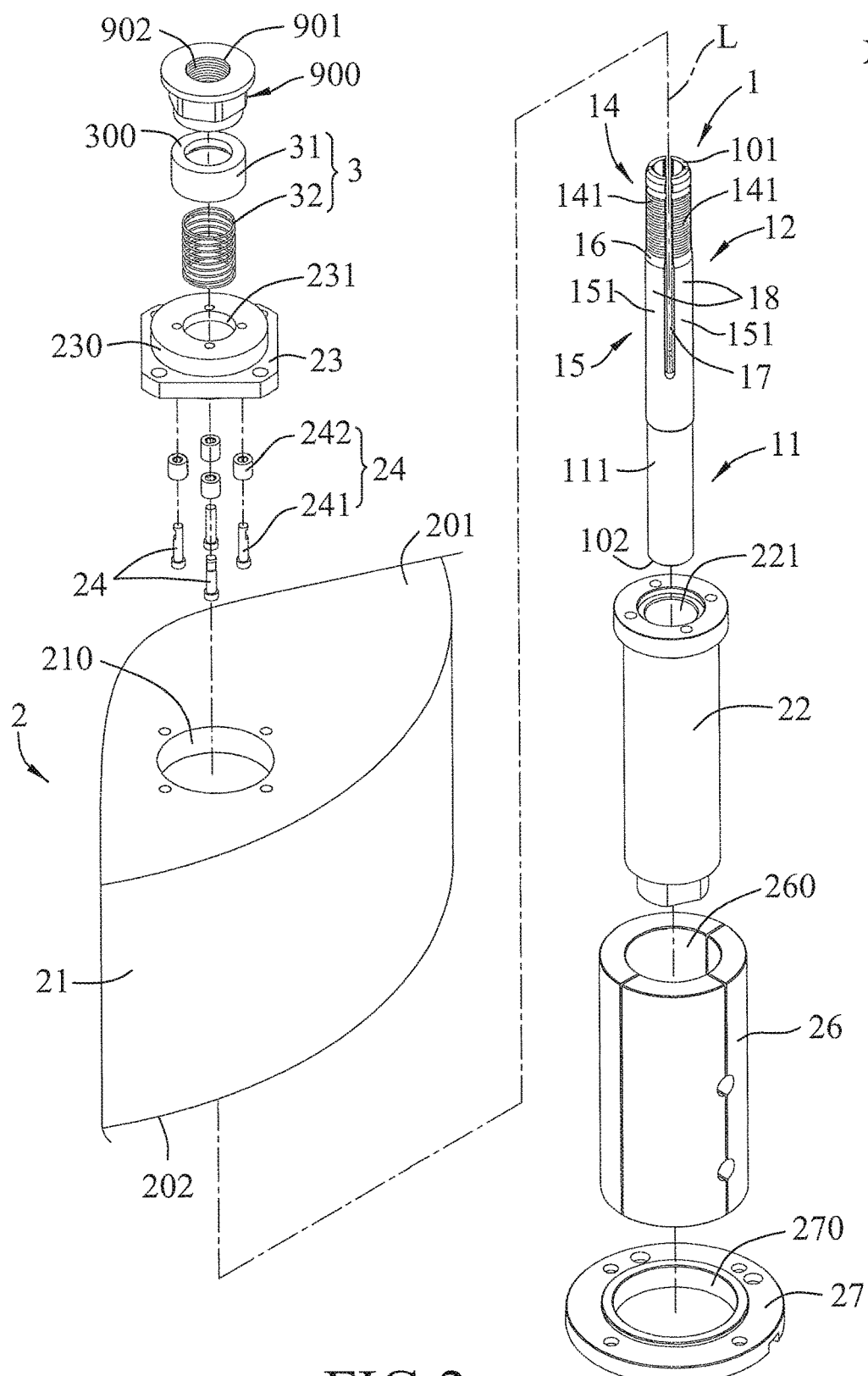
FIG. 2 is an exploded perspective view illustrating a quick-release engagement device according to a first embodiment of the disclosure.
Figure 3:
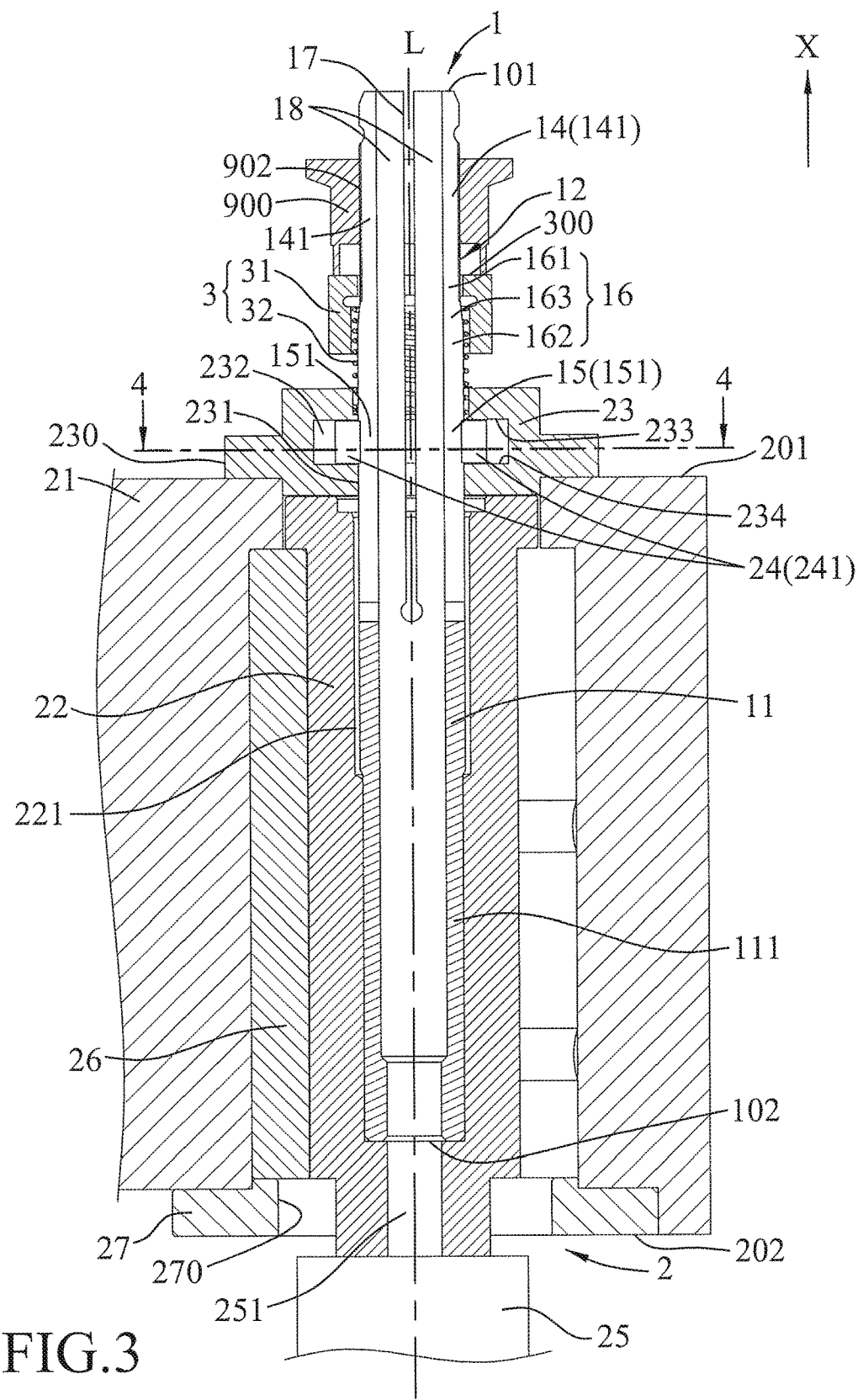
FIG. 3 is a partial cross-sectional view illustrating the quick-release engagement device according to the first embodiment of the disclosure.
Figure 4:
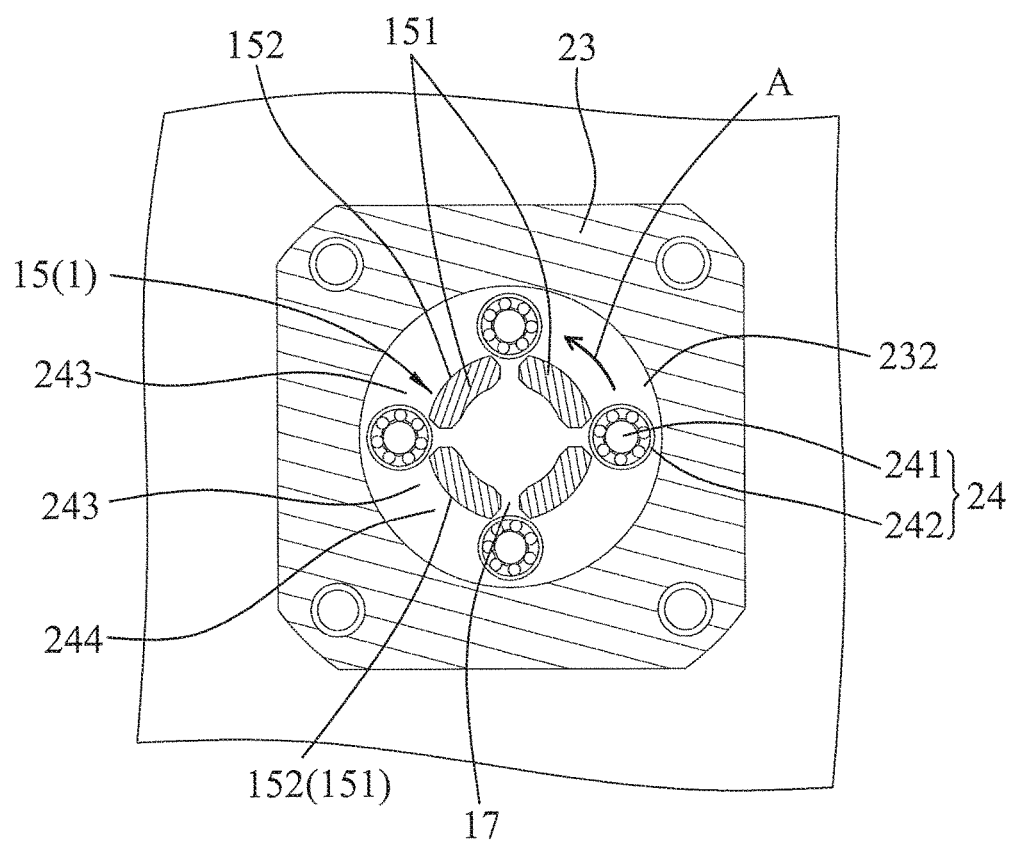
FIG. 4 is a cross-sectional view taken along line 4-4 of FIG. 3.

With reference to FIGS. 2 to 4, a quick-release engagement device for a female threaded member 900 is shown to include a tubular member 1, a mounting base 2, a drive member 25, and an actuating unit 24. The female threaded member 900 has a female threaded profile 902 which defines a female threaded hole 901, and which defines an inner minor diameter. In this embodiment, the female threaded member 900 is a nut. In the other embodiments, the female threaded member may be any elements with a female threaded profile, such as a bottle screw cap.

The tubular member 1 extends along a central axis (L) in the longitudinal direction (X) to terminate at upper and lower ends 101, 102, and includes a contractible portion 12 and a non-contractible portion 11 opposite to the contractible portion 12 in the longitudinal direction (X). The contractible portion 12 has the upper end 101, a male threaded segment 14 proximate to the upper end 101, and an actuated segment 15 which is distal from the upper end 101 and is disposed downwardly of the male threaded segment 14. The non-contractible portion 11 has the lower end 102 and a base segment 111. The base segment 111 is disposed between the lower end 102 and the actuated segment 15.

The contractible portion 12 has a plurality of slits 17 which extend from the upper end 101 through the male threaded segment 14 and the actuated segment 15, respectively, and which are angularly displaced from each other about the central axis (L) such that the contractible portion 12 is divided into a plurality of contractible sectors 18. Two adjacent ones of the contractible sectors 18 are gapped by a corresponding one of the slits 17. In this embodiment, the contractible portion 12 has four slits 17 and the contractible portion 12 is divided into four contractible sectors 18. In the other embodiments, the contractible portion 12 may have three or five slits.

As shown in FIG. 2, the actuated segment 15 is divided by the slits 17 into a plurality of actuated regions 151, two adjacent ones of which are gapped by the corresponding one of the slits 17. The male threaded segment 14 is divided by the slits 17 into a plurality of male threaded regions 141, two adjacent ones of which are gapped by the corresponding one of the slits 17.

In this embodiment, as shown in FIG. 3, the male threaded segment 14 has a smaller diameter than the actuated segment 15, and the contractible portion 12 has a transition segment 16 disposed between the male threaded segment 14 and the actuated segment 15. The transition segment 16 has a smaller dimension region 161 adjacent to the male threaded segment 14, a larger dimension region 162 adjacent to the actuated segment 15, and a transition region 163 which is disposed between the smaller and larger dimension regions 161, 162.

The mounting base 2 has an upper surface 201, a lower surface 202, and a through hole 221 which extends from the upper surface 201 along the central axis (L) to the lower surface 202, and which is configured to permit extension of the lower end 102 of the tubular member 1 therein.

As shown in FIGS. 2 and 3, the mounting base 2 includes a base body 21, a first sleeve member 26, a second sleeve member 22, and a third sleeve member 27. The base body 21 defines a first hole 210. The first sleeve member 26 is received in the first hole 210 and defines a second hole 260. The second sleeve member 22 is rotatably received in the second hole 260, and defines the through hole 221 configured to permit the base segment 111 to be fittingly received therein such that the tubular member 1 is rotated with the second sleeve member 22. The third sleeve member 27 is mounted to the base body 21 and defines a third hole 270 configured to permit access of an output shaft 251 of the drive member 25 to the second sleeve member 22. The base body 21 and the second sleeve member 22 cooperatively define the upper surface 201 of the mounting base 2. The base body 21 and the third sleeve member 27 cooperatively define the lower surface 202 of the mounting base 2.

The drive member 25 is disposed under the lower surface 202 of the mounting base 2, and has the output shaft 251 which is coupled to the lower end 102 of the tubular member 1 so as to drive the tubular member 1 to rotate about the central axis (L) by a predetermined angle. In this embodiment, the drive member 25 is a servomotor, and the output shaft 251 is coupled to the lower end 102 of the tubular member 1 through the second sleeve member 22. In other words, the second sleeve member 22 is driven by the drive member 25 to rotate to thereby drive rotation of the tubular member 1.

Figure 5:
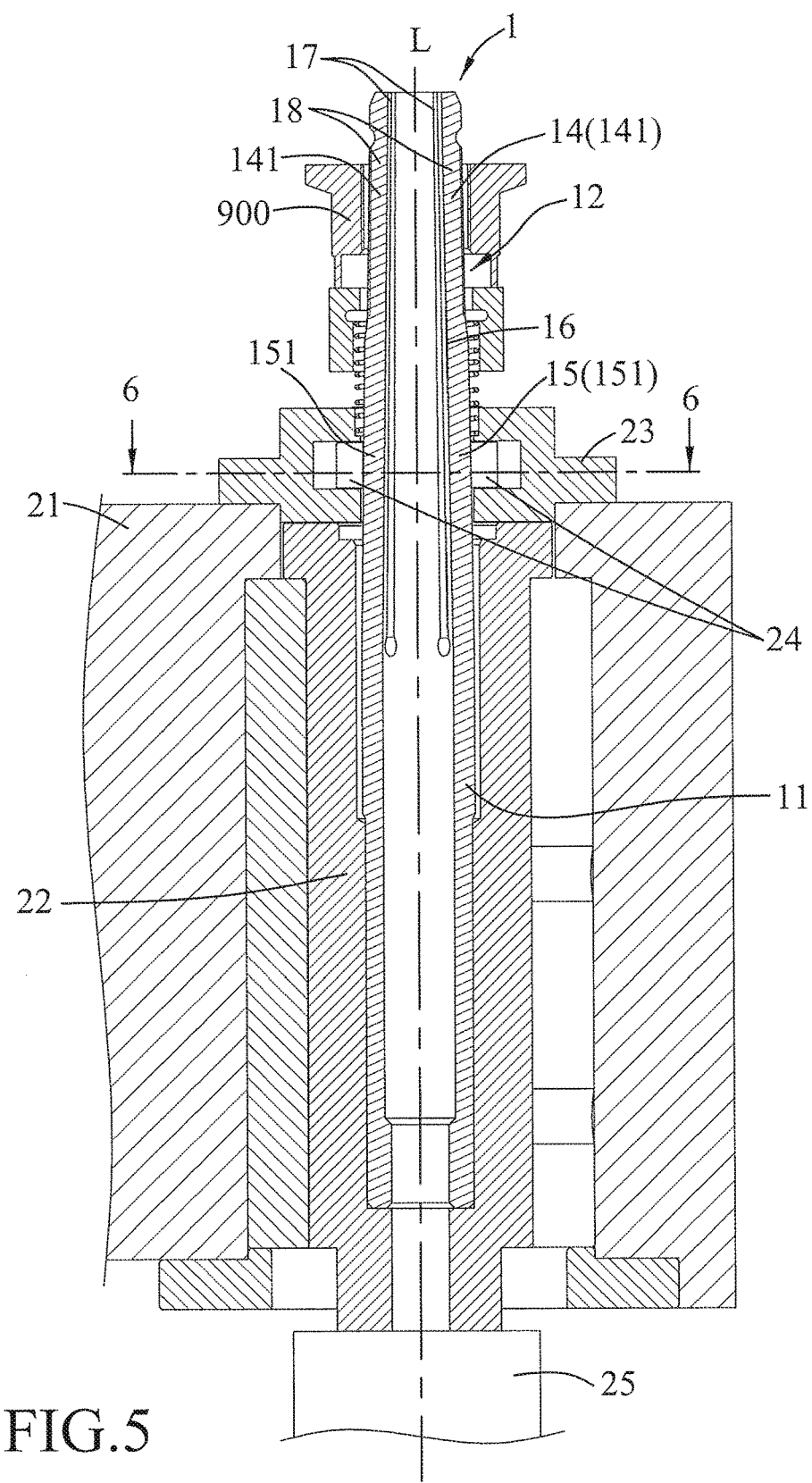
FIG. 5 is a partial cross-sectional view similar to FIG. 3 but illustrating actuated regions of a tubular member in a closer position.

The actuating unit 24 is configured to press the actuated segment 15 such that the contractible sectors 18 are permitted to move inwardly, radially, and synchronously from an expanded state (FIG. 3) to a contracted state (FIG. 5). In the expanded state, the contractible sectors 18 are remote from the central axis (L) to permit the female threaded member 900 to be in threaded engagement with the male threaded segment 14. In the contracted state, the contractible sectors 18 are closer to the central axis (L) to permit the female threaded member 900 to be quickly sleeved on or removed from the male threaded segment 14.

When the actuated segment 15 is pressed by the actuating unit 24, the actuated regions 151 are driven to radially and synchronously move from a remote position (FIG. 3), which corresponds to the expanded state, to a closer position (FIG. 5), which corresponds to the contracted state. In the remote position, the actuated regions 151 are remote from the central axis (L). In the closer position, the actuated regions 151 are closer to the central axis (L).

Furthermore, the male threaded regions 141 are configured to radially and respectively move with the actuated regions 151 between a contracted position (FIG. 5), which corresponds to the contracted state, and an expanded position (FIG. 3), which corresponds to the expanded state. In the contracted position, the male threaded regions 141 cooperatively define a smaller outer major diameter which is smaller than the inner minor diameter of the female threaded member 900 so as to permit the female threaded member 900 to be quickly sleeved on or removed from the male threaded segment 14. In the expanded position, the male threaded regions 141 cooperatively define a larger outer major diameter to permit the female threaded member 900 to be in threaded engagement with the male threaded segment 14.

In this embodiment, as shown in FIG. 2, the actuating unit 24 includes a plurality of roller pins 241 and a plurality of roller members 242. As shown in FIG. 3, the roller pins 241 are disposed to surround the actuated segment 15 on the upper surface 201 of the mounting base 2, and are displaced from each other about the central axis (L). The roller members 242 are rotatably mounted on the roller pins 241, respectively, and are displaced from each other about the central axis (L) by an angular zone 243 (see FIG. 4). The roller members 242 are configured such that when the actuated regions 151 are in the remote position (FIG. 3), a radially outmost area 152 of each of the actuated regions 151 is in radial alignment with a mid region 244 of a corresponding angular zone 243 (see FIG. 4), and such that when the actuated regions 151 are in the closer position (FIG. 5), the radially outmost area 152 of each of the actuated regions 151 is in frictional engagement with a corresponding one of the roller members 242 (see FIG. 6).

In this embodiment, the number of the roller members 242 corresponds to the number of the contractible sectors 18. In another embodiment, the number of the roller members 242 may be less than the number of the contractible sectors 18.

In this embodiment, the quick-release engagement device further includes a mounting sleeve 23 and a positioning unit 3.

As shown in FIGS. 2 and 3, the mounting sleeve 23 is mounted on the upper surface 201 of the mounting base 2, and is configured to be sleeved on the actuated segment 15 of the tubular member 1. The mounting sleeve 23 has an outer wall surface 230 and an inner wall surface 231 radially opposite to the outer wall surface 230. The inner wall surface 231 is formed with an annular groove 232 which extends radially from the inner wall surface 231 toward the outer wall surface 230, and which extends axially to terminate at an upper annular surface 233 and a lower annular surface 234. Each of the roller pins 241 is disposed between the upper and lower annular surfaces 233, 234 so as to permit the corresponding one of the roller members 242 to be rotatably received in the annular groove 232.

In this embodiment, the tubular member 1 is coupled to be driven by the drive member 25 to rotate about the central axis (L). In the other embodiments, the mounting sleeve 23 may be driven to rotate about the central axis (L) so as to permit the tubular member 1 to rotate relative to the roller members 24.

The positioning unit 3 includes a positioning sleeve 31 and a biasing member 32.

The positioning sleeve 31 is configured to be sleeved on the transition segment 16 in a predetermined position, and has a top surface 300 configured to be in abutting engagement with the female threaded member 900. In this embodiment, the positioning sleeve 31 is retained on the transition region 163 when the actuated regions 151 are in the remote position.

The biasing member 32 is disposed between the positioning sleeve 31 and the mounting sleeve 23 to bias the positioning sleeve 31 to the predetermined position. In this embodiment, the biasing member 32 is a compression spring. In the other embodiments, the biasing member 32 may be a rubber gasket, a Belleville washer, etc.

In another embodiment, the positioning unit 3 may include a flange member configured to permit the female threaded member 900 to seat thereon so as to ensure the female threaded member 900 to be sleeved on the male threaded segment 14.

In yet another embodiment, the positioning unit 3 may not be included, and the contractible portion 12 does not include the transition segment 16. When the female threaded member 900 seats on the mounting sleeve 23, the female threaded member 900 is sleeved on the male threaded segment 14.

A process for quickly engaging the female threaded member 900 on the tubular member 1 is explained as follow.

Figure 7:
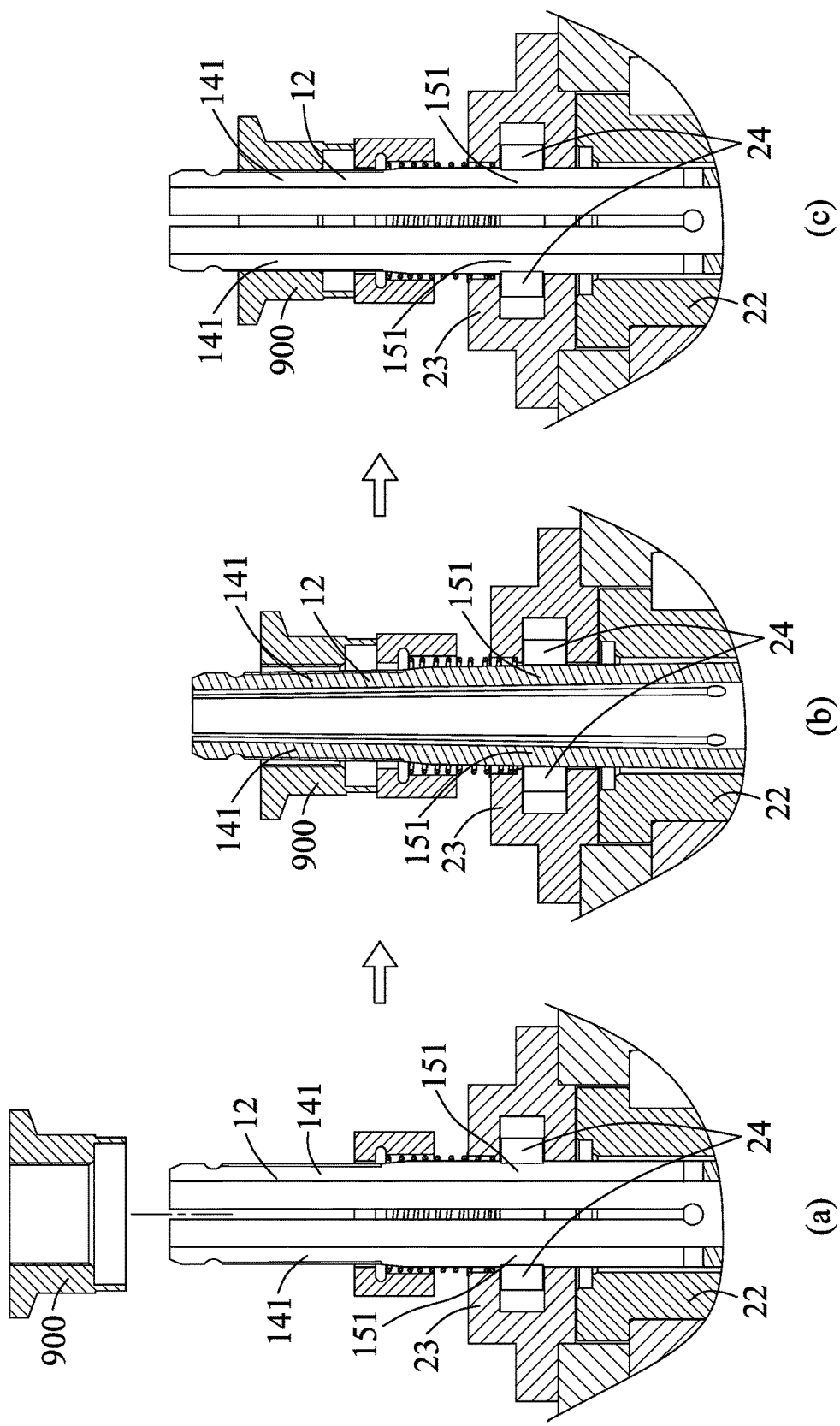
FIGS. 7(*a*), 7(*b*), and 7(*c*) are partial cross-sectional views illustrating successive steps for engaging a female threaded member on a male threaded segment of the tubular member.

Initially, the actuated regions 151 are in the remote position (see FIGS. 4 and 7(a)).

Figure 6:
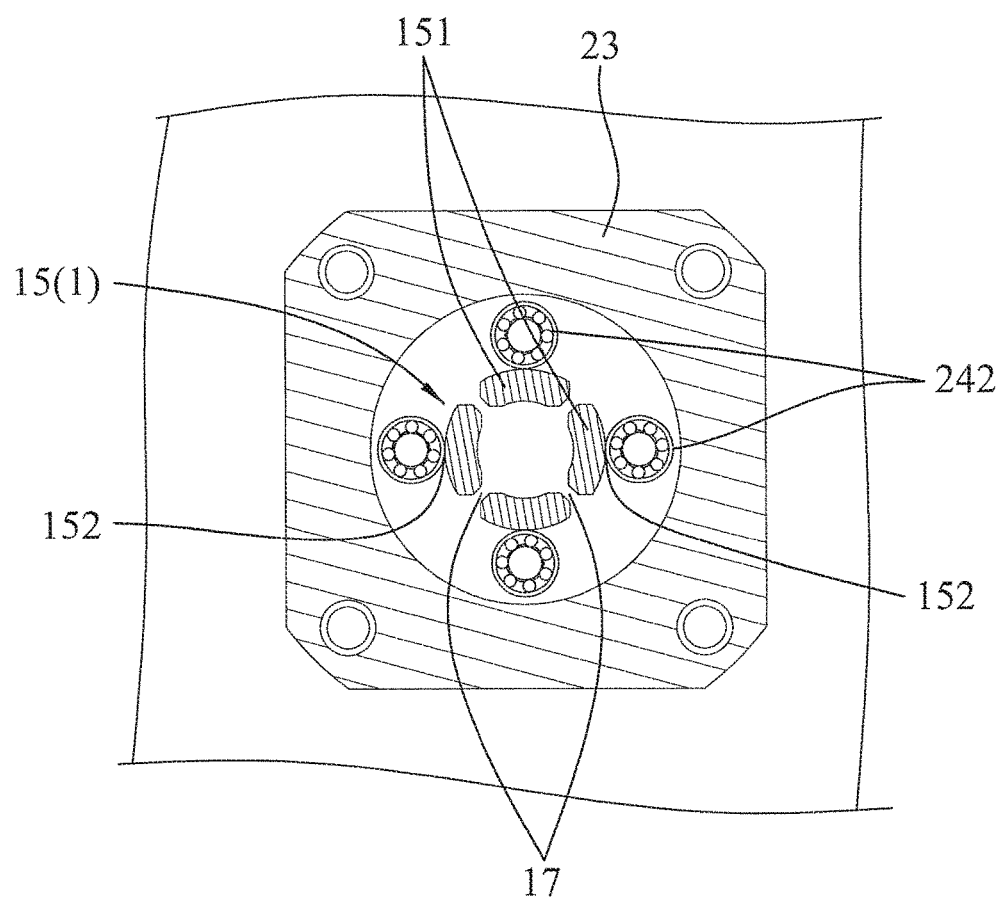
FIG. 6 is a cross-sectional view taken along line 6-6 of FIG. 5.

To engage the female threaded member 900 on the tubular member 1, the tubular member 1 is driven to rotate by the predetermined angle along a direction (A) shown in FIG. 4 to permit the actuated regions 151 and the male threaded regions 141 to be displaced to the closer position and the contracted position, respectively (see FIGS. 6 and 7(b)). At this moment, because the male threaded regions 141 cooperatively define a smaller outer major diameter which is smaller than the inner minor diameter of the female threaded member 900, the female threaded member 900 can be quickly sleeved on the male threaded segment 14.

Thereafter, the tubular member 1 is further driven to rotate by the predetermined angle to permit the actuated regions 151 and the male threaded regions 141 to be displaced to the remote position and the expanded position, respectively (see FIGS. 4 and 7(c)). At this moment, the female threaded member 900 is threaded engaged on the tubular member 1 and the user may inspect the female threaded member 900 using a testing instrument.

After testing, by further rotation of the tubular member 1 with the predetermined angle, the female threaded member 900 can be quickly removed from the male threaded segment 14 for testing a next female threaded member.

In addition, the female threaded member 900 engaged on the tubular member 1 may be subjected to, for example, scanning, coating, turning, etc.

Figure 8:
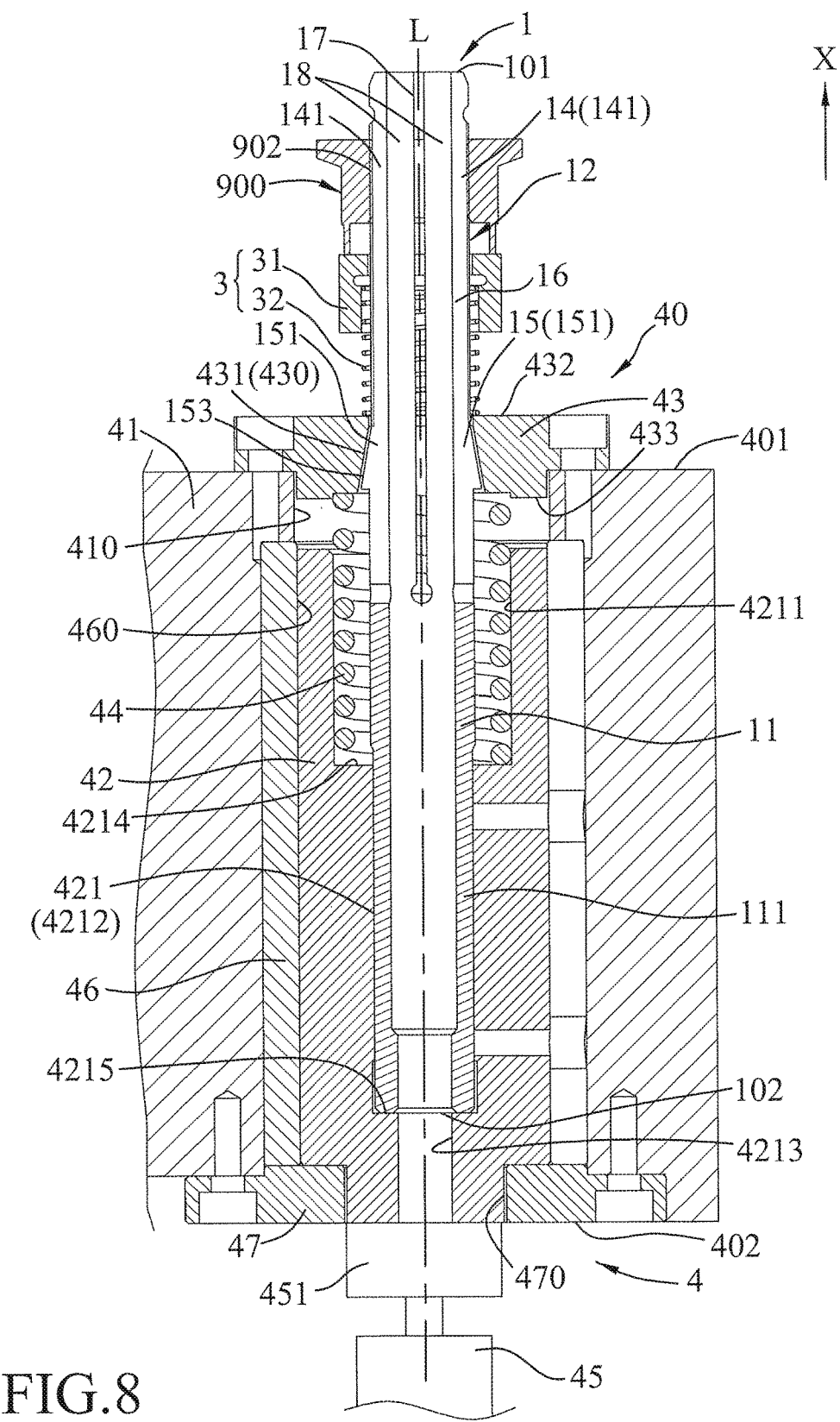
FIG. 8 is a partial cross-sectional view illustrating a quick-release engagement device according to a second embodiment of the disclosure.
Figure 9:
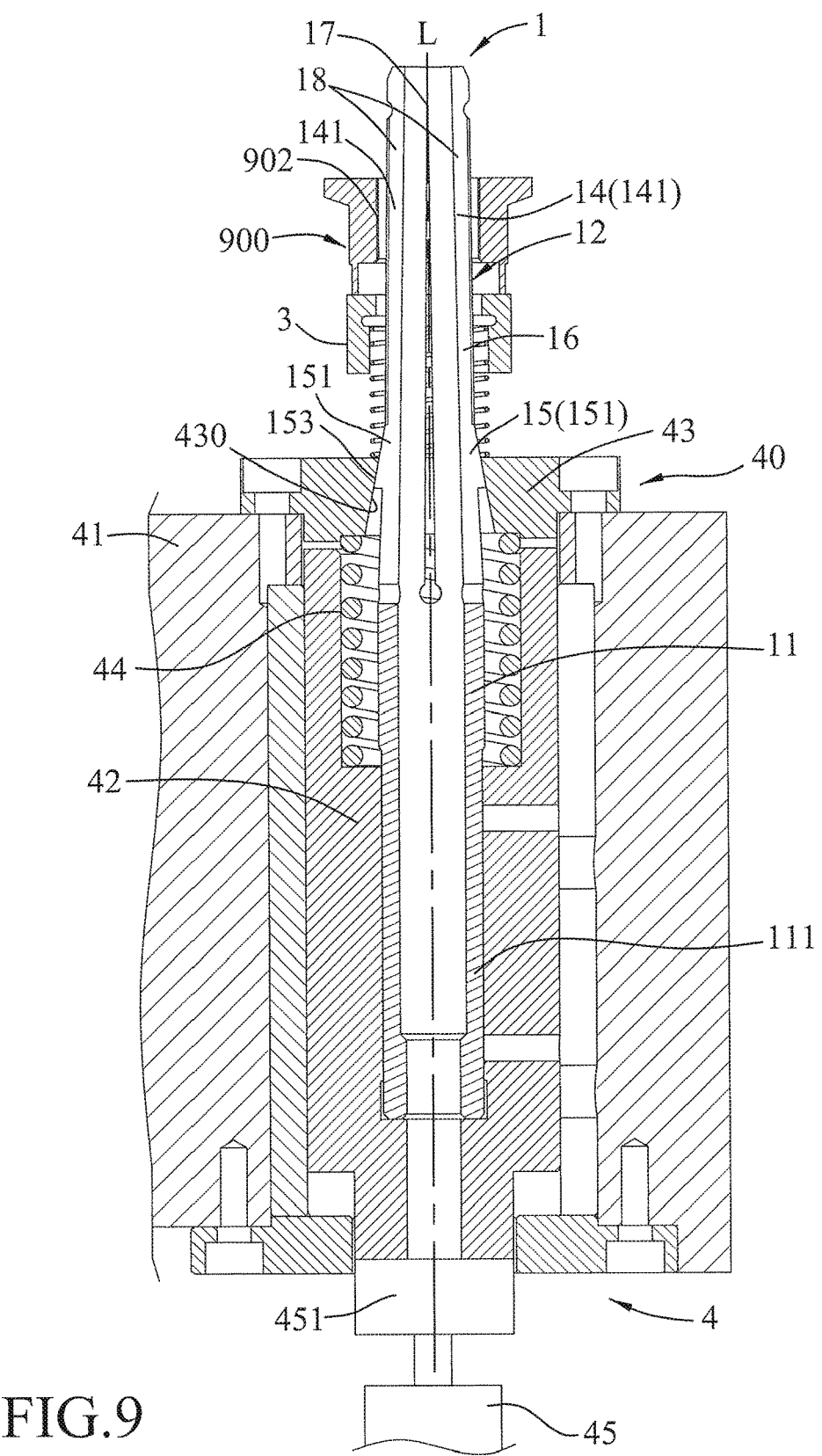
FIG. 9 is a partial cross-sectional view similar to FIG. 8 but illustrating actuated regions of a tubular member in a closer position.

FIGS. 8 and 9 illustrate a quick-release engagement device according to a second embodiment of the disclosure. The second embodiment is similar to the first embodiment, except that in the second embodiment, outer surfaces of the actuated regions 151 cooperatively constitute a male tapered surface 153, and except that in the second embodiment, the actuating unit 24, the mounting base 2, the drive member 25, and the mounting sleeve 23 of the first embodiment are replaced by an actuating unit 40, a mounting base 4, a lifting member 45, and a spring member 44.

The mounting base 4 has an upper surface 401, a lower surface 402, and a through hole 421 which extends from the upper surface 401 along the central axis (L) to the lower surface 402, and which is configured to permit extension of the lower end 102 of the tubular member 1 therein.

In this embodiment, the mounting base 4 has a base body 41, a first sleeve member 46, a second sleeve member 42, and a third sleeve member 47. The base body 41 defines a first hole 410. The first sleeve member 46 is received in the first hole 410 and defines a second hole 460. The second sleeve member 42 is received in the second hole 460 and is axially movable along the central axis (L). The second sleeve member 42 defines the through hole 421 having a larger-dimension hole segment 4211, a middle-dimension hole segment 4212, and a smaller-dimension hole segment 4213. A first shoulder 4214 is formed between the larger-dimension and middle-dimension hole segments 4211, 4212.

A second shoulder 4215 is formed between the middle-dimension and smaller-dimension hole segments 4212, 4213. The base segment 111 is fittingly received in the smaller-dimension hole segment 4212 and the lower end 102 is disposed to seat on the second shoulder 4215 to permit the tubular member 1 to be moved upwardly with the second sleeve member 42. The third sleeve member 47 is mounted to the base body 41 and defines a third hole 470 configured to permit access of a lift end 451 of the lifting member 45 to the second sleeve member 42. The base body 41 and the first sleeve member 46 cooperatively define the upper surface 401 of the mounting base 4. The base body 41 and the third sleeve member 47 cooperatively define the lower surface 402 of the mounting base 4.

The lifting member 45 is disposed under the lower surface 402 of the mounting base 4, and has the lift end 451 which is configured to exert a lifting force on the tubular member 1 to move the tubular member 1 from a lower position to an upper position along the central axis (L). In this embodiment, the lifting force is exerted on the second sleeve member 42 to force the second sleeve member 42, together with the tubular member 1, to move upwardly. Furthermore, in this embodiment, the lifting member 45 is a hydraulic cylinder or a pneumatic cylinder, and is operated using a pressurized fluid.

The actuating unit 40 includes a guide member 43 having an upward surface 432, a downward surface 433, and a tapering bore 431 which is defined by a female tapered surface 430, and which extends and tapers from the downward surface 433 to the upward surface 432. The female tapered surface 430 is configured to mate with the male tapered surface 153 such that when the tubular member 1 is in the lower position (FIG. 8), the male tapered surface 430 is unpressed by the female tapered surface 153 to permit the actuated regions 151 and the male threaded regions 141 to be in the remote position and the expanded position, respectively, and such that when the tubular member 1 is in the upper position (FIG. 9), the male tapered surface 153 is in pressed engagement with the female tapered surface 430 to place the actuated regions 151 and the male threaded regions 141 in the closer position and the contracted position, respectively.

The spring member 44 is disposed to be compressed in response to an upward movement of the tubular member 1 so as to permit the tubular member 1 to move from the upper position to the lower position once the tubular member 1 is relieved of the lifting force. In this embodiment, the spring member 44 is a compressed spring and is received in the larger-dimension hole segment 4211 of the through hole 421 between the first shoulder 4213 and the downward surface 433 of the guide member 43.

Besides, in the second embodiment, the biasing member 32 of the positioning unit 3 is disposed between the upward surface 432 of the guide member 43 and the positioning sleeve 31.

In this embodiment, the tubular member 1 is coupled to be driven by the lifting member 45 to axially move along the central axis (L). In the other embodiments, the guide member 43 may be driven to axially move along the central axis (L) so as to permit the tubular member 1 to axially move relative to the guide member 43.

Figure 10:
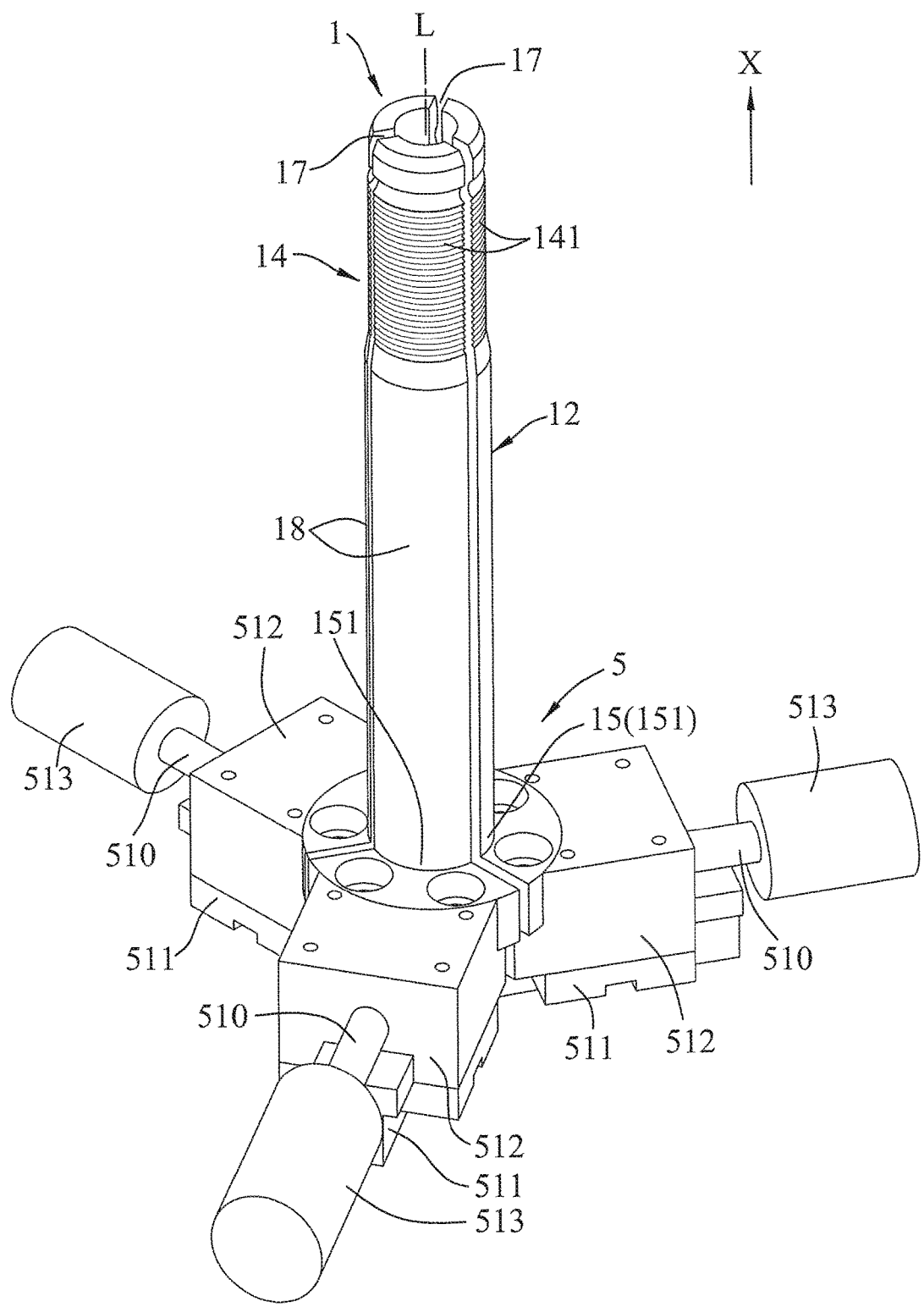
FIG. 10 is a perspective view illustrating a quick-release engagement device according to a third embodiment of the disclosure.

FIG. 10 illustrates a quick-release engagement device according to a third embodiment of the disclosure. The third embodiment includes a tubular member 1 and an actuating unit 5.

The tubular member 1 is similar to that of the first embodiment, except that in the third embodiment, the contractible portion 12 has three slits 17, and the tubular member 1 does not include the non-contractible portion 11.

The actuating unit 5 is configured to press the actuated regions 151 to move radially and synchronously from the remote position to the closer position, and includes a plurality of piston-cylinder members 513. Each of the piston-cylinder members 513 has a piston rod 510 coupled to a corresponding one of the actuated regions 151. The piston rods 510 of the piston-cylinder members 513 are configured to radially and synchronously drive the actuated regions 151 to move between the closer position and the remote position. In this embodiment, each of the piston-cylinder members 513 is a hydraulic cylinder or a pneumatic cylinder, and is operated using a pressurized fluid.

In this embodiment, the actuating unit 5 further includes a plurality of guide rails 511 and a plurality of sliding members 512. Each of the guide rails 511 extends in a radial direction relative to the central axis (L). Each of the sliding members 512 has a lower surface mounted slidably on a corresponding one of the guide rails 511, and an inner surface secured to the corresponding one of the actuated regions 151 such that the actuated regions 151 are permitted to move radially and synchronously with the sliding members 512, respectively.

The position rod 510 of each of the piston-cylinder members 513 is mounted to an outer surface of a corresponding one of the sliding members 512 such that the actuated regions 151 are driven by the piston-cylinder members 513 to move between the closer position and the remote position.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A releasable engagement device for a female threaded member with an inner minor diameter, said releasable engagement device comprising:
   a tubular member extending along a central axis, and including a contractible portion which has a male threaded segment and an actuated segment disposed downwardly of said male threaded segment, said contractible portion having a plurality of slits which extend through said male threaded segment and said actuated segment, respectively, and which are angularly displaced from each other about the central axis, such that said contractible portion is divided into a plurality of contractible sectors, two adjacent ones of which are gapped by a corresponding one of said slits; and an actuating unit configured to press said actuated segment such that said contractible sectors are permitted to move inwardly, radially, and synchronously from an expanded state, where said contractible sectors are remote from the central axis to permit the female threaded member to be in threaded engagement with said male threaded segment, to a contracted state, where said contractible sectors are closer to the central axis to permit the female threaded member to be sleeved on or removed from said male threaded segment;

wherein said tubular member extends along the central axis in the longitudinal direction to terminate at upper and lower ends, said contractible portion having said upper end, said male threaded segment being proximate to said upper end, said actuated segment being distal from said upper end, said actuated segment is divided by said slits into a plurality of actuated regions, two adjacent ones of which are gapped by the corresponding one of said slits, said actuated regions being configured to be pressed by said actuating unit to radially and synchronously move from a remote position corresponding to the expanded state, where said actuated regions are remote from the central axis, to a closer position corresponding to the contracted state, where said actuated regions are closer to the central axis, and said male threaded segment is divided by said slits into a plurality of male threaded regions, two adjacent ones of which are gapped by the corresponding one of said slits, said male threaded regions being configured to radially and respectively move with said actuated regions between a contracted position corresponding to the contracted state, where said male threaded regions cooperatively define a smaller outer major diameter which is smaller than the inner minor diameter of the female threaded member so as to permit the female threaded member to be sleeved on or removed from said male threaded segment, and an expanded position corresponding to the expanded state, where said male threaded regions cooperatively define a larger outer major diameter to permit the female threaded member to be in threaded engagement with said male threaded segment, said releasable engagement device further includes a mounting base having an upper surface, a lower surface, and a through hole which extends from said upper surface along the central axis to said lower surface, and which is configured to permit extension of said lower end of said tubular member therein; and a drive member disposed under said lower surface of said mounting base, and having an output shaft which is coupled to said lower end of said tubular member so as to drive said tubular member to rotate about the central axis by a predetermined angle, wherein said tubular member includes a non-contractible portion which is opposite to said contractible portion in the longitudinal direction, and which has said lower end and a base segment that is disposed between said lower end and said actuated segment, and that is configured to be fittingly received in said through hole of said mounting base, and said actuating unit includes a plurality of roller pins disposed to surround said actuated segment on said upper surface of said mounting base, and displaced from each other about the central axis, and a plurality of roller members which are rotatably mounted on said roller pins, respectively, and which are displaced from each other about the central axis by an angular zone, said roller members being configured such that when said actuated regions are in the remote position, a radially outmost area of each of said actuated regions is in radial alignment with a mid region of a corresponding angular zone, and such that when said actuated regions are in the closer position, said radially outmost area of each of said actuated regions is in frictional engagement with a corresponding one of said roller members.

2. The releasable engagement device according to claim 1, wherein said drive member is a servomotor.

3. The releasable engagement device according to claim 1, further comprising a mounting sleeve which is mounted on said upper surface of said mounting base, and which is configured to be sleeved on said actuated segment of said tubular member, said mounting sleeve having an outer wall surface and an inner wall surface radially opposite to said outer wall surface, said inner wall surface being formed with an annular groove which extends radially from said inner wall surface toward said outer wall surface, and which extends axially to terminate at an upper annular surface and a lower annular surface, each of said roller pins being disposed between said upper and lower annular surfaces so as to permit the corresponding one of said roller members to be rotatably received in said annular groove.

4. The quick release releasable engagement device according to claim 1, wherein said male threaded segment has a smaller diameter than said actuated segment, and said contractible portion has a transition segment disposed between said male threaded segment and said actuated segment, said releasable engagement device further comprising a positioning unit which includes a positioning sleeve which is configured to be sleeved on said transition segment in a predetermined position, and which has a top surface configured to be in abutting engagement with the female threaded member, and a biasing member disposed to bias said positioning sleeve to the predetermined position.

5. A releasable engagement device for a female threaded member with an inner minor diameter, said releasable engagement device comprising:

a tubular member extending along a central axis, and including a contractible portion which has a male threaded segment and an actuated segment disposed downwardly of said male threaded segment, said contractible portion having a plurality of slits which extend through said male threaded segment and said actuated segment, respectively, and which are angularly displaced from each other about the central axis, such that said contractible portion is divided into a plurality of contractible sectors, two adjacent ones of which are gapped by a corresponding one of said slits; and an actuating unit configured to press said actuated segment such that said contractible sectors are permitted to move inwardly, radially, and synchronously from an expanded state, where said contractible sectors are remote from the central axis to permit the female threaded member to be in threaded engagement with said male threaded segment, to a contracted state, where said contractible sectors are closer to the central axis to permit the female threaded member to be sleeved on or removed from said male threaded segment;

wherein said tubular member extends along the central axis in the longitudinal direction to terminate at upper and lower ends, said contractible portion having said upper end, said male threaded segment being proximate to said upper end, said actuated segment being distal from said upper end, said actuated segment is divided by said slits into a plurality of actuated regions, two adjacent ones of which are gapped by the corresponding one of said slits, said actuated regions being configured to be pressed by said actuating unit to radially and synchronously move from a remote position corresponding to the expanded state, where said actuated regions are remote from the central axis, to a closer position corresponding to the contracted state, where said actuated regions are closer to the central axis, and said male threaded segment is divided by said slits into a plurality of male threaded regions, two adjacent ones of which are gapped by the corresponding one of said slits, said male threaded regions being configured to radially and respectively move with said actuated regions between a contracted position corresponding to the contracted state, where said male threaded regions cooperatively define a smaller outer major diameter which is smaller than the inner minor diameter of the female threaded member so as to permit the female threaded member to be sleeved on or removed from said male threaded segment, and an expanded position corresponding to the expanded state, where said male threaded regions cooperatively define a larger outer major diameter to permit the female threaded member to be in threaded engagement with said male threaded segment, wherein outer surfaces of said actuated regions cooperatively constitute a male tapered surface, and said actuating unit includes a guide member having an upward surface, a downward surface, and a tapering bore which is defined by a female tapered surface, and which extends and tapers from said downward surface to said upward surface, said female tapered surface being configured to mate with said male tapered surface, said releasable engagement device further includes a lifting member having a lift end which is configured to exert a lifting force such that said tubular member is moved along the central axis relative to said guide member from a lower position, where said male tapered surface is unpressed by said female tapered surface to permit said actuated regions and said male threaded regions to be in the remote position and the expanded position, respectively, to an upper position, where said male tapered surface is in pressed engagement with said female tapered surface to place said actuated regions and said male threaded regions in the closer position and the contracted position, respectively; and a spring member which is disposed to be compressed in response to an upward movement of said tubular member relative to said guide member so as to permit said tubular member to move relative to said guide member from the upper position to the lower position once said tubular member is relieved of the lifting force.

6. The releasable engagement device according to claim 5, further comprising:

a mounting base having an upper surface, a lower surface, and a through hole which extends from said upper surface along the central axis to said lower surface, and which is configured to permit extension of said lower end of said tubular member therein;

wherein said lifting member is disposed under said lower surface of said mounting base, and said tubular member includes a non-contractible portion which is opposite to said contractible portion in the longitudinal direction, and which has said lower end and a base segment that is disposed between said lower end and said actuated segment, and that is configured to be fittingly received in said through hole of said mounting base.

7. A releasable engagement device for a female threaded member with an inner minor diameter, said releasable engagement device comprising:

a tubular member extending along a central axis, and including a contractible portion which has a male threaded segment and an actuated segment disposed downwardly of said male threaded segment, said contractible portion having a plurality of slits which extend through said male threaded segment and said actuated segment, respectively, and which are angularly displaced from each other about the central axis, such that said contractible portion is divided into a plurality of contractible sectors, two adjacent ones of which are gapped by a corresponding one of said slits; and an actuating unit configured to press said actuated segment such that said contractible sectors are permitted to move inwardly, radially, and synchronously from an expanded state, where said contractible sectors are remote from the central axis to permit the female threaded member to be in threaded engagement with said male threaded segment, to a contracted state, where said contractible sectors are closer to the central axis to permit the female threaded member to be sleeved on or removed from said male threaded segment;

wherein said tubular member extends along the central axis in the longitudinal direction to terminate at upper and lower ends, said contractible portion having said upper end, said male threaded segment being proximate to said upper end, said actuated segment being distal from said upper end, said actuated segment is divided by said slits into a plurality of actuated regions, two adjacent ones of which are gapped by the corresponding one of said slits, said actuated regions being configured to be pressed by said actuating unit to radially and synchronously move from a remote position corresponding to the expanded state, where said actuated regions are remote from the central axis, to a closer position corresponding to the contracted state, where said actuated regions are closer to the central axis, and said male threaded segment is divided by said slits into a plurality of male threaded regions, two adjacent ones of which are gapped by the corresponding one of said slits, said male threaded regions being configured to radially and respectively move with said actuated regions between
- a contracted position corresponding to the contracted state, where said male threaded regions cooperatively define a smaller outer major diameter which is smaller than the inner minor diameter of the female threaded member so as to permit the female threaded member to be sleeved on or removed from said male threaded segment, and
- an expanded position corresponding to the expanded state, where said male threaded regions cooperatively define a larger outer major diameter to permit the female threaded member to be in threaded engagement with said male threaded segment, wherein said actuating unit includes a plurality of piston-cylinder members each having a piston rod coupled to a corresponding one of said actuated regions, said piston rods of said piston-cylinder members being configured to radially and synchronously drive said actuated regions to move between the closer position and the remote position.

\* \* \* \* \*